(12) United States Patent
Kayama et al.

(10) Patent No.: US 7,660,222 B2
(45) Date of Patent: Feb. 9, 2010

(54) OPTICAL DISK APPARATUS AND INFORMATION RECORDING/REPRODUCTION METHOD

(75) Inventors: Hiroshi Kayama, Takatsuki (JP); Kazuo Momoo, Hirakata (JP)

(73) Assignee: Panasonic Corporation, Kadoma (JP)

( * ) Notice: Subject to any disclaimer, the term of this patent is extended or adjusted under 35 U.S.C. 154(b) by 392 days.

(21) Appl. No.: 10/557,292

(22) PCT Filed: May 19, 2004

(86) PCT No.: PCT/JP2004/007154

§ 371 (c)(1), (2), (4) Date: Nov. 18, 2005

(87) PCT Pub. No.: WO2004/105006

PCT Pub. Date: Dec. 2, 2004

(65) Prior Publication Data

US 2006/0262672 A1 Nov. 23, 2006

(30) Foreign Application Priority Data

May 20, 2003 (JP) ............................ 2003-141719

(51) Int. Cl.
*G11B 7/00* (2006.01)
(52) U.S. Cl. .................................. 369/53.26
(58) Field of Classification Search ............. 369/44.11, 369/53.26, 120
See application file for complete search history.

(56) References Cited

U.S. PATENT DOCUMENTS

| | | | | |
|---|---|---|---|---|
| 5,251,194 | A * | 10/1993 | Yoshimoto et al. | 369/44.26 |
| 5,986,984 | A * | 11/1999 | Nakamura et al. | 369/44.23 |
| 6,950,378 | B1 * | 9/2005 | Miyazaki et al. | 369/47.52 |

2002/0163946 A1 11/2002 Tanase

FOREIGN PATENT DOCUMENTS

EP 0 645 766 3/1995

(Continued)

OTHER PUBLICATIONS

International Search Report for corresponding Application No. PCT/JP2004/007154, mailed Sep. 7, 2004.

(Continued)

*Primary Examiner*—Peter Vincent Agustin
*Assistant Examiner*—Aneeta Yodichkas
(74) *Attorney, Agent, or Firm*—Renner, Otto, Boisselle & Sklar, LLP (57) ABSTRACT

An optical disk apparatus including: a light source; an objective lens for converging light emitted from the light source toward an optical disk; a first photodetection device for detecting reflected light from the optical disk and outputting a first signal; a signal processing section for receiving the first signal and generating a signal containing information recorded on the optical disk; a second photodetection device for detecting a portion of the light emitted from the light source and outputting a second signal; a light source driving section for receiving the second signal, and based on the second signal, driving the light source so that output power of the light source equals a target value; and an amplitude fluctuation detection section for detecting an amplitude fluctuation amount of the second signal, and if the amplitude fluctuation amount exceeds a predetermined value, changing driving characteristics of the light source driving section.

20 Claims, 8 Drawing Sheets

FOREIGN PATENT DOCUMENTS

| | | |
|---|---|---|
| JP | 04-302831 | 10/1992 |
| JP | 05-217193 | 8/1993 |
| JP | 05-315687 | 11/1993 |
| JP | 2001-143299 | 5/2001 |
| JP | 2001-189028 | 7/2001 |

OTHER PUBLICATIONS

Supplementary European Search Report issued on Aug. 8, 2008 for corresponding European Patent Application No. 04733982.5.

* cited by examiner

GND

FIG.10B  GND

OPTICAL DISK APPARATUS AND INFORMATION RECORDING/REPRODUCTION METHOD

TECHNICAL FIELD

The present invention relates to an optical disk apparatus and an information recording/reproduction method using an optical disk apparatus.

BACKGROUND ART

Figure 12:
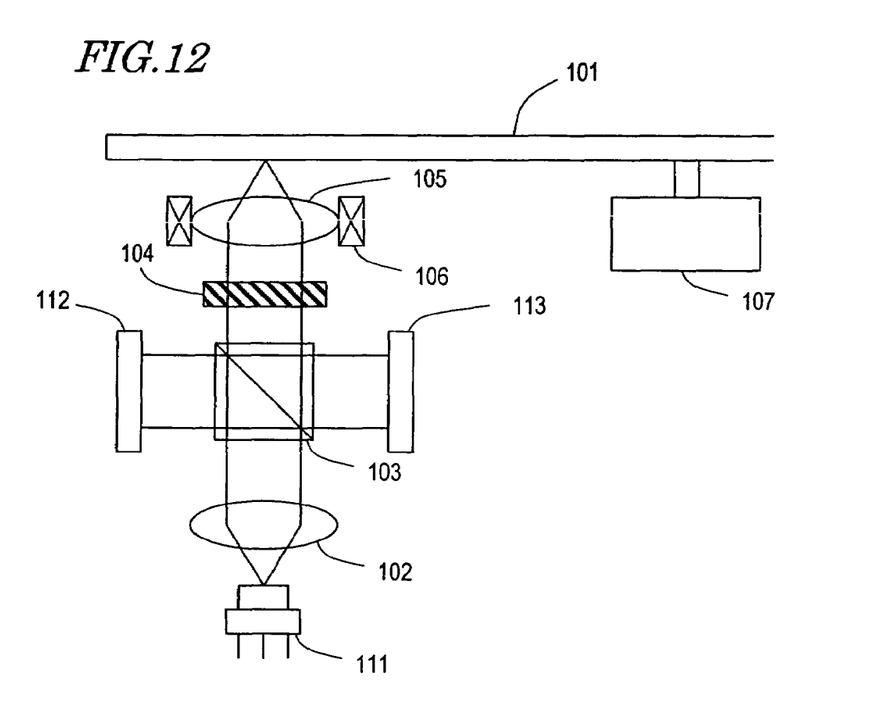
FIG. 12 is a block diagram showing the constitution of a conventional optical disk apparatus.

In recent years, recordable optical disks which allow a large amount of information to be recorded thereon, and optical disk apparatuses which are compatible with them, are becoming prevalent. FIG. 12 schematically shows the structure of a conventional optical disk apparatus which only performs reproduction or a conventional optical disk apparatus which performs recording and reproduction. Since an optical disk apparatus which performs recording is generally also capable of reproduction, an optical disk apparatus which performs recording and reproduction will simply be referred to as an optical disk apparatus which performs recording, in the present specification.

In the conventional optical disk apparatus shown in FIG. 12, light emitted from a laser 111 is converged by a collimating lens 102 so as to take a predetermined convergence state, and enters a polarization beam splitter 103 (which may also be abbreviated as PBS). The polarization beam splitter 103 reflects the incident light so that a portion thereof will enter a frontlight detector 112. Most of the incident light is transmitted through the polarization beam splitter, and enters a quarter-wave plate 104, where the polarization direction of the incident light is converted from linear polarization to circular polarization.

On a recording layer of an optical disk 101 which is rotated by a spindle motor 107, the light which has been transmitted through the quarter-wave plate 104 is converged by an objective lens 105, which is driven by an actuator 106, so as to take a predetermined convergence state.

The light which has been converged on the recording layer of the optical disk 101 is reflected from the recording layer, so that the reflected light enters the quarter-wave plate 104 via the objective lens 105. The quarter-wave plate 104 converts the polarization direction of the reflected light from circular polarization to linear polarization. This polarization direction is perpendicular to the polarization direction of the light which is emitted from the laser 111, transmitted through the polarization beam splitter 103, and travels toward the quarter-wave plate 104.

The light which has been transmitted through the quarter-wave plate 104 enters the polarization beam splitter 103. As described above, this light is perpendicular to the polarization direction of the light which is allowed to be transmitted through the polarization beam splitter 103, and therefore is not transmitted through to the laser 111 side, but is reflected toward a photodetector 113.

Figure 13A:
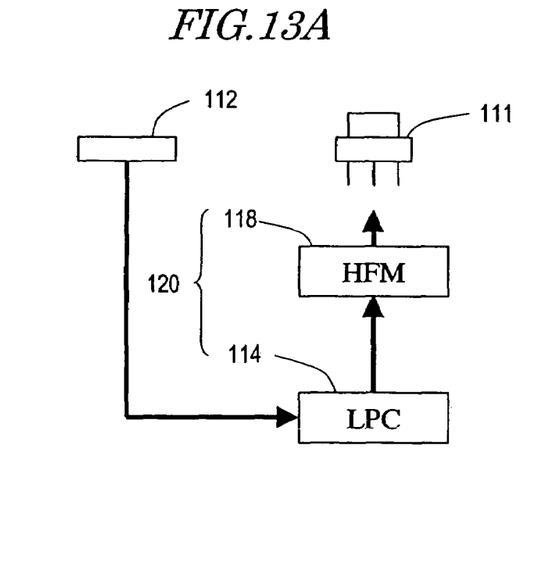
FIG. 13A and FIG. 13B are block diagrams showing the constitution of a light source driving section and a signal processing section, respectively.
Figure 13B:
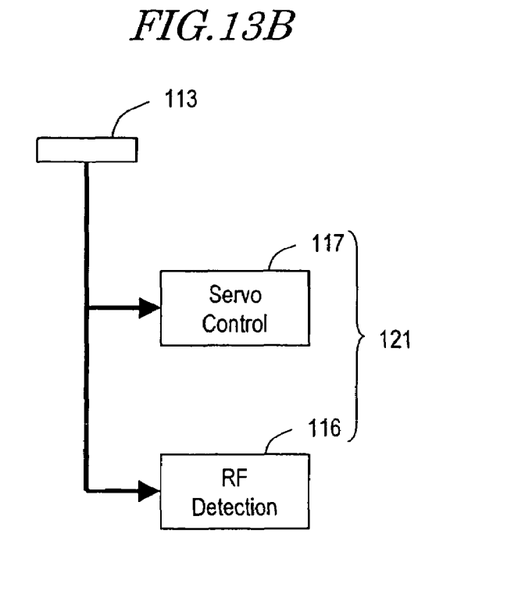

FIG. 13A and FIG. 13B respectively show the general constitution of a light source driving section 120 and a signal processing section 121 which are connected to the frontlight detector 112 and the photodetector 113.

As shown in FIG. 13A, the light which is received by the frontlight detector 112 is converted into an electrical signal, and is output as a frontlight signal to the light source driving section 120. Based on the frontlight signal, the light source driving section 120 drives the laser 111 in such a manner that the laser light emitted from the laser 111 has a constant output power. For this purpose, the light source driving section 120 includes a laser power controller (hereinafter abbreviated as LPC) 114 and a high-frequency module (hereinafter abbreviated as HFM) 118. The LPC 114 extracts a low-frequency component from the frontlight signal, and controls a driving current for driving the laser 111 so that the low-frequency component of the frontlight signal stays constant. The HFM 118 subjects the driving current received from the LPC 114 to a high-frequency modulation, so that the laser 111 is driven with the modulated driving current.

On the other hand, as shown in FIG. 13B, the light received by the photodetector 113 is converted into an electrical signal, and input to the signal processing section 121 as an RF signal. The signal processing section 121 includes a servo control section 117 and an RF detection section 116, and the RF signal is input to the servo control section 117 and the RF detection section 116. Based on the RF signal, the servo control section 117 generates a focusing signal, a tracking signal, and the like for moving the objective lens along the focusing direction and the tracking direction. From the RF signal, the RF detection section 116 generates a reproduced signal, which contains the user information, address information, and the like recorded on the optical disk 101.

The polarization directions of the quarter-wave plate 104 and the polarization beam splitter 103 are designed so that almost all of the reflected light from the optical disk 101 enters the photodetector 113. In practice, however, due to variation in the amount of birefringence at a substrate which is provided on the recording layer surface of the optical disk 101, variation in the optical characteristics and adjustment of the quarter-wave plate 104, the polarization beam splitter 103, and the like, and fluctuation and variation in the wavelength of the laser 111, etc., the polarization direction of the polarization beam splitter 103 and the polarization direction of the reflected light are not completely perpendicular, so that there will be some light entering the laser 111 in an actual optical disk apparatus. This light is referred to as "returned light".

In general, returned light increases as the light emitted from the laser 111 increases. However, depending on the phase difference between the light emitted from the laser 111 and the reflected light from the optical disk 101, the reflected light may be weakened due to interference with the light emitted from the laser 111. In this case, conversely, returned light will decrease as the light emitted from the laser 111 increases. The returned light to the laser 111 is absorbed in a semiconductor chip of the laser 111, thus contributing to the resonation of the laser 111, i.e., emission. For this reason, the laser emission efficiency increases in the presence of returned light, whereby the output power is increased.

Figure 14:
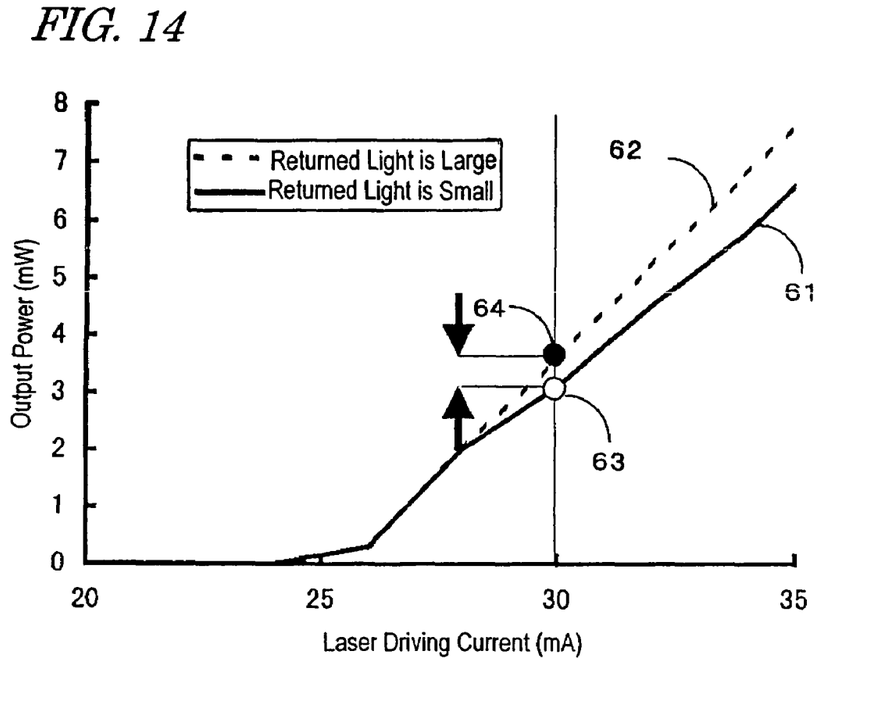
FIG. 14 is a graph showing relationships between the driving current and output power of a laser.

FIG. 14 is a graph showing relationships between the driving current and the output power of a laser. In the figure, a solid line 61 shows a relationship in the case where the light amount of the returned light to the laser is small, whereas a broken line 62 shows a relationship in the case where the light amount of the returned light to the laser is large.

Via control of the LPC 114 utilizing the frontlight signal as described above, the output power of the laser 111 is adjusted so as to be constant. Herein, output power means the outgoing light amount from the laser.

When the optical disk apparatus reproduces information which is recorded on the optical disk 101, the light amount of the reflected light rapidly changes while tracing on the recording marks, pits, spaces, and the like which are formed on the optical disk 101. As a result, the light amount of the returned light to the laser 111 also changes.

However, since the changes in the light amount of the reflected light due to recording marks and spaces occur sufficiently faster than the control of the LPC 114, if a state in which there is a small amount of returned light (a white circle 63 in the graph) transitions to a state where there is a large amount of returned light (a black circle 64 in the graph) due to a change in the light amount of the reflected light, the output power will change within a range sandwiched by the two arrows. In other words, although the current which drives the laser 111 does not change, the output power will change, that is, the emission efficiency will change. Such fluctuations in the output power will hereinafter be referred to as scoop.

Figure 15A:
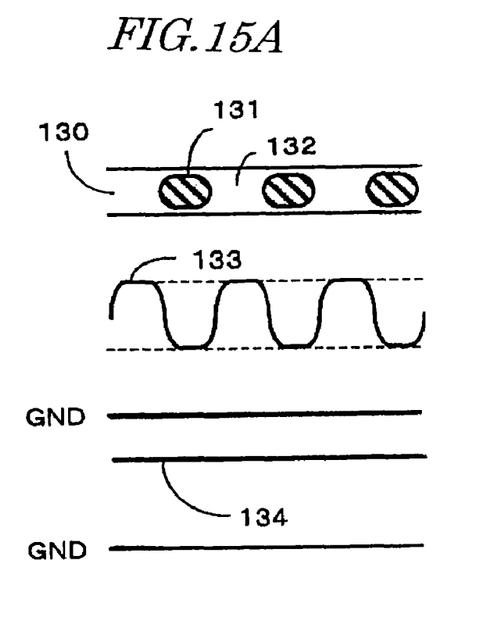
FIG. 15A and FIG. 15B are diagrams schematically showing correspondence between recording marks on an optical disk and an RF signal and a frontlight signal.
Figure 15B:
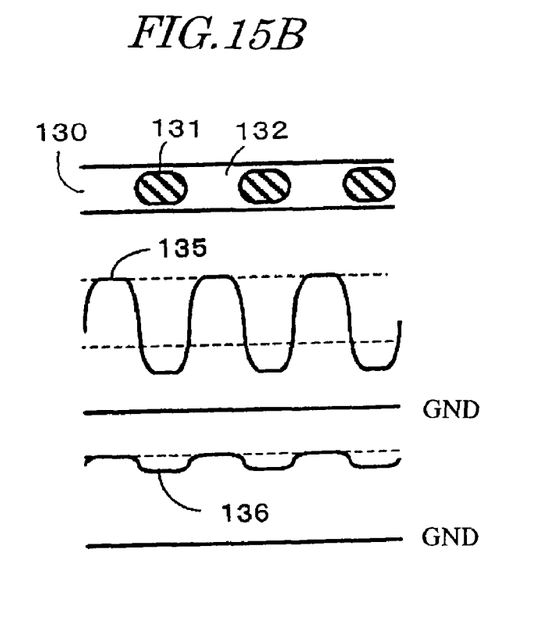

FIG. 15A and FIG. 15B show relationships between recording marks, an RF signal, and a frontlight signal. As shown in FIG. 15A, when recording marks 131 and a space 132 are disposed on a recording track 130 of an optical disk as in the figure, reflectance will decrease at the recording marks 131. However, in the absence of scoop, the frontlight signal 134 stays constant. In other words, the output power of the laser 111 does not change. As a result, as shown in the figure, an RF signal 133 having a proper waveform is obtained.

On the other hand, as shown in FIG. 15B, if the light amount of the returned light increases, the output power of the laser 111 fluctuates in accordance with the change in the light amount of the returned light, thus causing scoop. As a result, the frontlight signal 136 also fluctuates. Since fluctuation in the frontlight signal 136 due to scoop occurs sufficiently faster than the control speed of the LPC 114, the LPC 114 does not control the driving current for the laser 111 in response to the fluctuation in the frontlight signal 136. Therefore, to the RF signal 135, not only the fluctuation due to a change in the reflectance and phase of the recording marks 131 and the space 132, but also the fluctuation in the emission efficiency due to scoop is applied. For example, when the peak intensity of the RF signal 135 is used as a reference, due to a decrease in reflectance as well as a decrease in emission efficiency, the intensity becomes smaller in the regions of the recording marks 131. Therefore, the asymmetry and degree of modulation will shift relative to those of the RF signal 133 in FIG. 15A. As a result, the quality of the RF signal is degraded, and the reproduction jitter and error rate are deteriorated.

When performing a recording to an optical disk on an optical disk apparatus which performs recording and reproduction, it is necessary to form recording mark which satisfy a predetermined standard or reference, in order to guarantee a compatibility such that the recorded optical disk will permit correct reproduction also on another optical disk apparatus. Therefore, on such an optical disk apparatus, a predetermined recording pattern is first recorded onto the optical disk. Then, the recorded marks are irradiated with light, and the asymmetry and degree of modulation of an RF signal which is obtained through reproduction are evaluated. Based on the evaluation result, the optical disk apparatus adjusts the laser power used for recording so that the formed recording marks satisfy a predetermined standard or reference.

At this learning, if the laser output power has fluctuations due to scoop, the RF signal obtained from recording marks which are formed in the aforementioned manner cannot be correctly evaluated. If asymmetry is lost, a write compensation learning: for adjusting for edge shifts at the front end and rear end of a recording mark can no longer be performed accurately, either.

In order to reduce such scoop which exerts unfavorable influences on RF signal detection, for example, Japanese Laid-Open Patent Publication No. 2001-189028 proposes increasing the reflectance on the outgoing face of the laser in order to reduce the amount of returned light to the laser. Moreover, Japanese Laid-Open Patent Publication No. 2001-143299 discloses increasing reproduction power to suppress noise when a jitter due to scoop increases during reproduction of an optical disk. Moreover, Japanese Laid-Open Patent Publication No. 05-217193 proposes varying the oscillation frequency and duty of an HFM based on the reproduced radius of the optical disk, thus suppressing scoop.

However, according to the method of Japanese Laid-Open Patent Publication No. 2001-189028, the returned light may rather increase in the case where the reflectance of the optical disk is greater than that of the outgoing end face of the laser, thus deteriorating the reproduction jitter and error rate. Moreover, according to the method of Japanese Laid-Open Patent Publication No. 2001-143299, it is necessary to measure the jitter, and sufficient effects cannot be obtained in the case where the reproduced signal has a poor signal quality.

Moreover, the light amount of the returned light to the laser 111 also changes due to causes other than tracing on recording marks, pits, spaces, and the like formed on the optical disk 101. For example, if the optical disk 101 which is under reproduction is warped, the distance between the laser 111 and the recording layer of the optical disk 101 will fluctuate. Therefore, the phase difference between the light emitted from the laser 111 and the reflected light from the optical disk 101 will fluctuate, thus resulting in changes in the intensity of the returned light due to light interference. Such fluctuations in the returned light also cause scoop, whereby the RF signal quality will be degraded and the reproduction jitter and error rate will be deteriorated.

DISCLOSURE OF INVENTION

In view of the aforementioned problems, the present invention aims to provide an optical disk apparatus and an information recording/reproduction method which suppress deterioration in the reproduction jitter, error rate, and the like associated with scoop, and which makes it possible to obtain a high-quality reproduced signal.

An optical disk apparatus according to the present invention comprises: a light source; an objective lens for converging light emitted from the light source toward an optical disk; a first photodetection device for detecting reflected light from the optical disk and outputting a first signal; a signal processing section for receiving the first signal and generating a signal containing information recorded on the optical disk; a second photodetection device for detecting a portion of the light emitted from the light source and outputting a second signal; a light source driving section for receiving the second signal, and based on the second signal, driving the light source so that output power of the light source equals a target value; and an amplitude fluctuation detection section for detecting an amplitude fluctuation amount of the second signal, and if the amplitude fluctuation amount exceeds a predetermined value, changing driving characteristics of the light source driving section.

In a preferred embodiment, the light source driving section includes a current control section for receiving the second signal and generating a driving current which is controlled so that the output power of the light source equals the target value, and a high-frequency module for modulating the driving current with a predetermined frequency and oscillation power.

In a preferred embodiment, the amplitude fluctuation detection section detects the amplitude fluctuation amount of the second signal, and if the amplitude fluctuation amount exceeds the predetermined value, changes a modulation frequency of the high-frequency module.

In a preferred embodiment, the amplitude fluctuation detection section detects the amplitude fluctuation amount of the second signal, and if the amplitude fluctuation amount exceeds the predetermined value, changes an oscillation power of the high-frequency module.

In a preferred embodiment, the current control section generates the driving current based on a predetermined frequency component of the second signal, and the predetermined frequency component is approximately 1/10 or less of a frequency of the first signal.

In a preferred embodiment, the amplitude fluctuation detection section detects the amplitude fluctuation amount of the second signal, and if the amplitude fluctuation amount exceeds the predetermined value, changes the target value in the current control section.

In a preferred embodiment, the amplitude fluctuation detection section receives the first signal, and based on the first signal, detects an amplitude fluctuation amount of a component of the second signal that is in synchronization with the first signal.

In a preferred embodiment, the amplitude fluctuation detection section includes a high-pass filter, and detects the amplitude fluctuation amount of the second signal having passed through the high-pass filter.

In a preferred embodiment, the amplitude fluctuation detection section changes an oscillation power in accordance with the type of the optical disk.

An information recording/reproduction method according to the present invention is an information recording/reproduction method by an optical disk apparatus including: a light source; an objective lens for converging light emitted from the light source toward an optical disk; a first photodetection device for detecting reflected light from the optical disk and outputting a first signal; and a signal processing section for receiving the first signal and generating a signal containing information recorded on the optical disk, the information recording/reproduction method comprising: a step of detecting a portion of the light emitted from the light source and outputting a second signal; a step of receiving the second signal, and based on the second signal, driving the light source so that output power of the light source equals a target value; and a step of detecting an amplitude fluctuation amount of the second signal, and if the amplitude fluctuation amount exceeds a predetermined value, changing driving characteristics in the step of driving the light source.

In a preferred embodiment, the step of driving the light source includes a step of receiving the second signal and generating a driving current which is controlled so that the output power of the light source equals the target value, and a step of modulating the driving current with a predetermined frequency and oscillation power.

In a preferred embodiment, the step of changing the driving characteristics detects the amplitude fluctuation amount of the second signal, and if the amplitude fluctuation amount exceeds the predetermined value, changes a modulation frequency in the modulation step.

In a preferred embodiment, the amplitude fluctuation detection section detects the amplitude fluctuation amount of the second signal, and if the amplitude fluctuation amount exceeds the predetermined value, changes an oscillation power of the high-frequency module.

In a preferred embodiment, the step of driving the light source executes a step of generating the driving current based on a frequency component of the second signal, the predetermined frequency component being approximately 1/10 or less of a frequency of the first signal.

In a preferred embodiment, the step of changing the driving characteristics detects the amplitude fluctuation amount of the second signal, and if the amplitude fluctuation amount exceeds the predetermined value, changes the target value in the step of generating the driving current.

In a preferred embodiment, the step of changing the driving characteristics receives the first signal, and based on the first signal, detects an amplitude fluctuation amount of a component of the second signal that is in synchronization with the first signal.

In a preferred embodiment, the step of changing the driving characteristics further includes a step of removing a low-range component from the second signal, and detects the amplitude fluctuation amount of the signal from which the low-range component has been removed.

In a preferred embodiment, the step of changing the driving, characteristics changes an oscillation power in accordance with the type of the optical disk.

BEST MODE FOR CARRYING OUT THE INVENTION

First Embodiment

Hereinafter, a first embodiment of the present invention will be described with reference to the drawings. The present embodiment illustrates an optical disk apparatus which, especially in the presence of a scoop that is in synchronization with an RF signal, suppresses deterioration of the reproduction jitter, error rate, and the like, and provides a high-quality reproduced signal. Compared to a scoop due to other causes, a scoop which is in synchronization with an RF signal is most influential on the fluctuation or deformation of the waveform of the RF signal.

Figure 1:
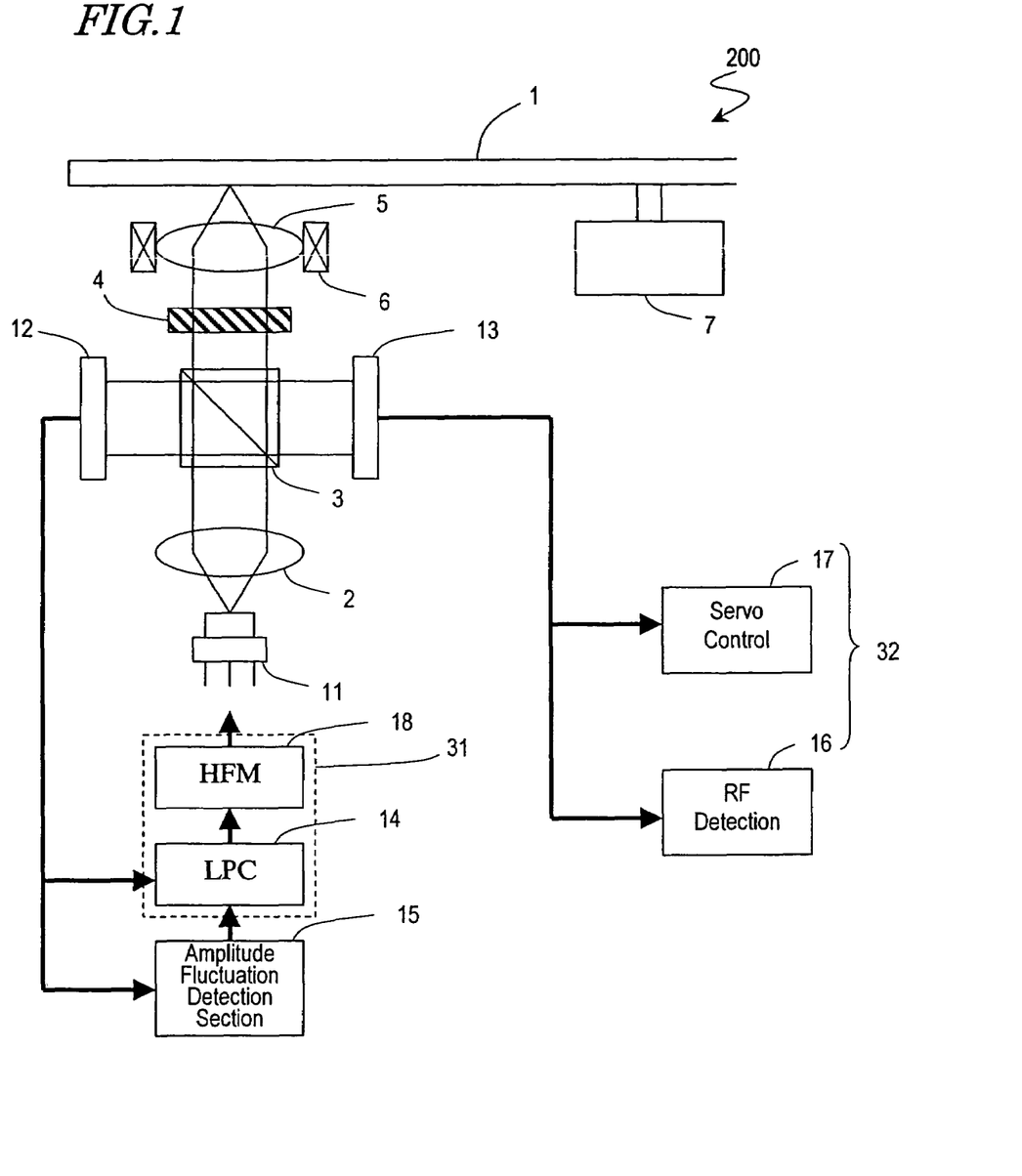
FIG. 1 is a block diagram showing a first embodiment of an optical disk apparatus according to the present invention.

FIG. 1 is a block diagram showing the first embodiment of an optical disk apparatus according to the present invention. The optical disk apparatus 200 is suitably used as an optical disk apparatus capable of performing recording or reproduction which supports, in addition to optical disks such as DVD-RAMs and DVD-R/RWs, high-recording-density optical disks for which recording is performed by using laser light in the ultraviolet region (e.g., about 405 nm).

The optical disk apparatus 200 comprises a laser 11, an objective lens 5, a photodetector 13, a frontlight detector 12, a light source driving section 31, an amplitude fluctuation detection section 15, and a signal processing section 32. In addition, the optical disk apparatus 200 preferably comprises a collimating lens 2, a polarization beam splitter 3, a quarter-wave plate 4, an actuator 6, and a spindle motor 7.

The laser 11, which is used as a light source for recording and reproduction, emits laser light of a wavelength which is in accordance with the type or standard of the optical disk. Although FIG. 1 only shows one laser 11, the optical disk apparatus 200 may comprise a plurality of lasers 11 and/or photodetectors 13 so as to support a plurality of different types of optical disks 1.

Light which is emitted from the laser 11 is converged by the collimating lens 2 so as to take a predetermined convergence state, and enters the polarization beam splitter 3. The polarization beam splitter 3 reflects the incident light so that a portion thereof will enter the frontlight detector 12. Most of the incident light is transmitted through the polarization beam splitter, and enters the quarter-wave plate 4, where the polarization direction of the incident light is converted from linear polarization to circular polarization.

On a recording layer of the optical disk 1 which is rotated by the spindle motor 7, the light which has been transmitted through the quarter-wave plate 4 is converged by the objective lens 5, which is driven by the actuator 6, so as to take a predetermined convergence state.

The light which has been converged on the recording layer of the optical disk 1 is reflected from the recording layer, so that the reflected light enters the quarter-wave plate 4 via the objective lens 5. The quarter-wave plate 4 converts the polarization direction of the reflected light from circular polarization to linear polarization. This polarization direction is perpendicular to the polarization direction of the light which is transmitted through the quarter-wave plate 4 and travels toward the objective lens 5.

The light which has been transmitted through the quarter-wave plate 4 enters the polarization beam splitter 3, and is reflected toward the photodetector 13.

The photodetector 13 functions as a first photodetection device. The photodetector 13 converts the received light into an electrical signal, and outputs it to the signal processing section 32 as an RF signal, which is a first signal. The signal processing section 32 includes a servo control section 17 and an RF detection section 16, and the RF signal is input to the servo control section 17 and the RF detection section 16. Based on the RF signal, the servo control section 17 generates a focusing signal, a tracking signal, and the like for moving the objective lens along the focusing direction and the tracking direction in order to radiate a light beam onto a track of the rotating optical disk in a predetermined convergence state. From the RF signal, the RF detection section 16 generates a reproduced signal, which contains the user information, address information, and the like recorded on the optical disk 1.

The frontlight detector 12 functions as a second photodetection device. Light which is received by the frontlight detector 12 is converted into an electrical signal, and is output to the light source driving section 31 and the amplitude fluctuation detection section 15 as a frontlight signal, which is a second signal. Since the light which is detected by the frontlight detector 12 is a portion of the light emitted from the laser 11, the light received by the frontlight detector 12 and the frontlight signal are in proportion with the output power of the laser 11.

Based on the frontlight signal, the light source driving section 31 drives the laser 11 so that the output power of the laser light emitted from the laser 11 stays constant at a target value. Specifically, the light source driving section 31 includes an LPC 14 and an HFM 18. The LPC 14 extracts a low-frequency component from the frontlight signal, and controls a driving current for driving the laser 11 so that the low-frequency component of the frontlight signal stays constant, thus preventing the output power of the laser 11 from fluctuating from the target value. The HFM 18 subjects the driving current received from the LPC 14 to a high-frequency modulation, so that the laser 11 is driven with the modulated driving current.

The amplitude fluctuation detection section 15 detects the amplitude of the frontlight signal, and if the amount of amplitude fluctuation exceeds a predetermined value, changes the driving characteristics of the light source driving section 31. The driving characteristics to be changed include the current for driving the laser 11, the modulation frequency when performing high-frequency modulation, the oscillation power, and the like. In the present embodiment, the returned light from the laser 11 changes in accordance with the recording marks, pits, or spaces on the tracks. In other words, the returned light is fluctuating in synchronization with the aforementioned RF signal.

Therefore, due to influence of the returned light, the emission efficiency of the laser 11 will change, so that amplitude fluctuations associated with the recording marks and spaces will occur in the frontlight. Therefore, by detecting such amplitude fluctuations and changing the driving characteristics of the light source driving section 31 so that the amplitude fluctuations are reduced, the scoop in the light emitted from the laser 11 is reduced.

Figure 2:
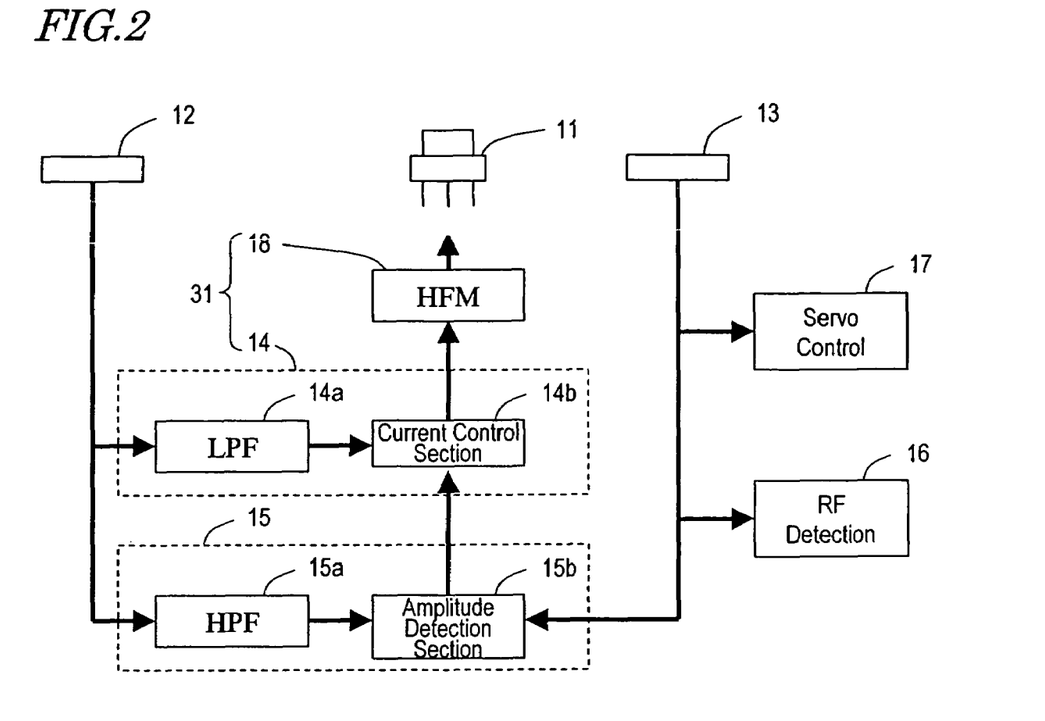
FIG. 2 is a block diagram showing the constitution of a light source driving section and an amplitude fluctuation detection section of the optical disk apparatus shown in FIG. 1.

Hereinafter, the light source driving section 31 and the amplitude fluctuation detection section 15 will be described in detail. FIG. 2 is a block diagram showing the specific constitution of the LPC 14 and the amplitude fluctuation detection section 15 of the light source driving section 31. The LPC 14 includes a low-pass filter (LPF) 14a and a current control section 14b. It is necessary that the LPC 14 has response characteristics that are sufficiently slower than the frequency of the RF signal which is obtained from the photodetector 13, so as not to react in response to the change in the intensity of the reflected light caused by the recording marks and spaces. For this reason, the low-pass filter 14a has characteristics such that a signal component of a frequency which is sufficiently lower than the frequency of the RF signal from the frontlight signal is allowed to be transmitted therethrough, but that the high-range component, which is a frequency component of the RF signal, is removed. For example, in the case where the optical disk is a DVD, a signal component having a frequency of several tens of kHz or less is allowed to be transmitted.

Figure 3A:
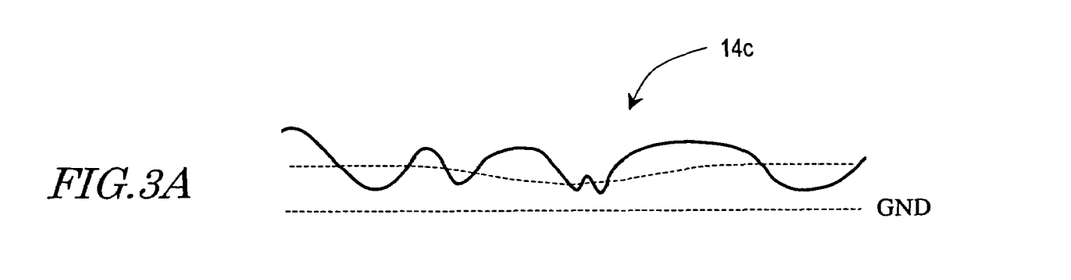
FIG. 3A and FIG. 3B show signal waveforms in the light source driving section.

FIG. 3A shows the waveform of a frontlight signal which is output from the frontlight detector 12. As described above, since the returned light fluctuates in synchronization with the RF signal, the frontlight signal also exhibits changes which are in synchronization with the RF signal. At a portion of the waveform indicated by an arrow 14c, the signal output is lowered. This means that the average output power of the laser 11 is lowered at the portion indicated by the arrow 14c.

Figure 3B:
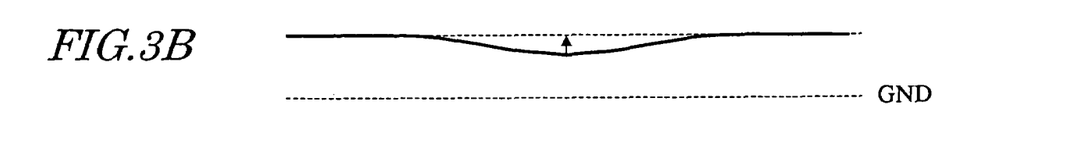

FIG. 3B shows the waveform of the frontlight signal having passed through the low-pass filter 14a. As shown in FIG. 3B, the frontlight signal having passed through the low-pass filter 14a only exhibits a low-frequency component because the RF signal component, which is a high-frequency component, has been removed.

The current control section 14b receives the frontlight signal, adjusts the driving current for driving the laser 11 so that the low-frequency component stays constant at a predetermined value, and outputs the driving current to the HFM 18. Through this control, as shown in FIG. 3B, the low-frequency component signal from the frontlight signal, indicated by the solid line, is brought up as shown by the arrow, thus taking a constant value shown by the broken line. Since the frontlight signal is in proportion with the output power of the laser 11, the low-frequency component of the output power of the laser 11 also stays constant because the low-frequency component signal of the frontlight signal is constant. Therefore, by determining the value to which the frontlight signal is controlled so that the output power of the laser 11 attains the target value, the laser 11 is controlled so as to emit light with an output power at the target value.

Note that, although the LPC 14 includes the low-pass filter 14a in the present embodiment, the low-pass filter 14a can be omitted in the case where the frequency characteristics (response characteristics) of the current control section 14b are about the same as or lower than those of the low-pass filter 14a. In other words, the LPC 14 may adjust the driving current for driving the laser 11 by responding to the frontlight signal at a frequency which is approximately 1/10 or less of the frequency of the RF signal which is obtained from the optical disk 1.

In order to reduce the influence of scoop in the laser 11, the HFM 18 modulates the received driving current with a high-frequency, thus superposing a high-frequency AC current on the driving current, and applies the modulated driving current to the laser 11.

Figure 3C:
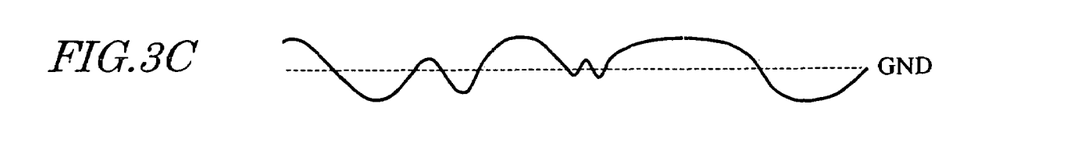
FIG. 3C shows a signal waveform in the amplitude fluctuation detection section.

The amplitude fluctuation detection section 15 detects an amplitude fluctuation amount of the frontlight signal, and if the amplitude fluctuation amount exceeds a predetermined value, changes the driving characteristics of the light source driving section 31. For this purpose, the amplitude fluctuation detection section 15 includes a high-pass filter 15a and an amplitude detection section 15b, receives the frontlight signal and passes it through the high-pass filter 15a, and inputs the frontlight signal having passed through the high-pass filter 15a to the amplitude detection section 15b. The amplitude fluctuation detection section 15 detects fluctuations in a high-frequency component of the frontlight signal. For this purpose, the high-pass filter 15a has characteristics such that it blocks or removes a low-range component, i.e., a signal which has a lower frequency than the frequency of the RF signal. In the case where the optical disk 1 is a DVD, the high-pass filter 15a has characteristics such that it allows any frequency higher than several hundreds of kHz to pass therethrough. FIG. 3C shows the waveform of a signal which is obtained by the frontlight signal shown in FIG. 3A being passed through the high-pass filter 15a. Although, as shown in the figure, the output is lowered on the waveform of the frontlight signal at the portion indicated as 14c, the frontlight signal having passed through the high-pass filter 15a only contains a high-frequency component, and the average fluctuation in the output has been removed.

Figure 4:
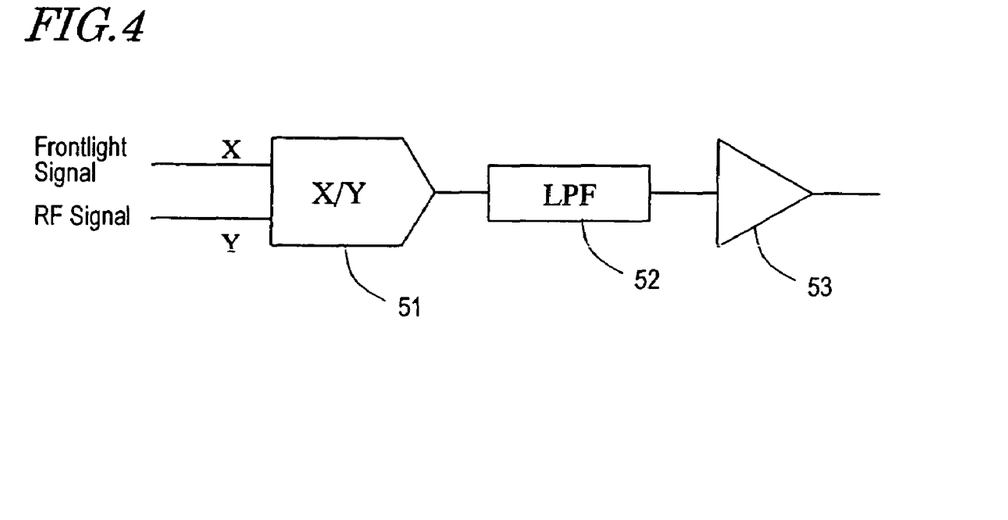
FIG. 4 is a block diagram showing a more detailed constitution of the amplitude detection section according to the first embodiment.

The amplitude detection section 15b detects the amplitude fluctuation amount of the frontlight signal having passed through the high-pass filter 15a, and changes the driving characteristics of the light source driving section 31 if the amplitude fluctuation amount exceeds the predetermined value. As shown in FIG. 4, the amplitude detection section 15b includes, for example, a divider 51, a low-pass filter 52, and a comparator 53.

Figure 5A:
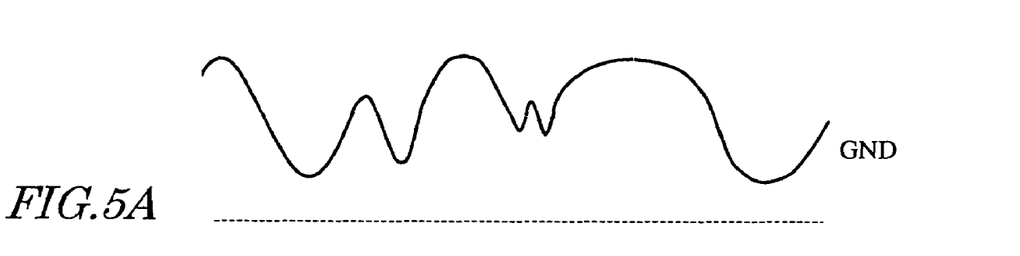
FIG. 5A to FIG. 5C show waveforms of signals at various points in the amplitude fluctuation detection section according to the first embodiment.
Figures 5B, 5C:
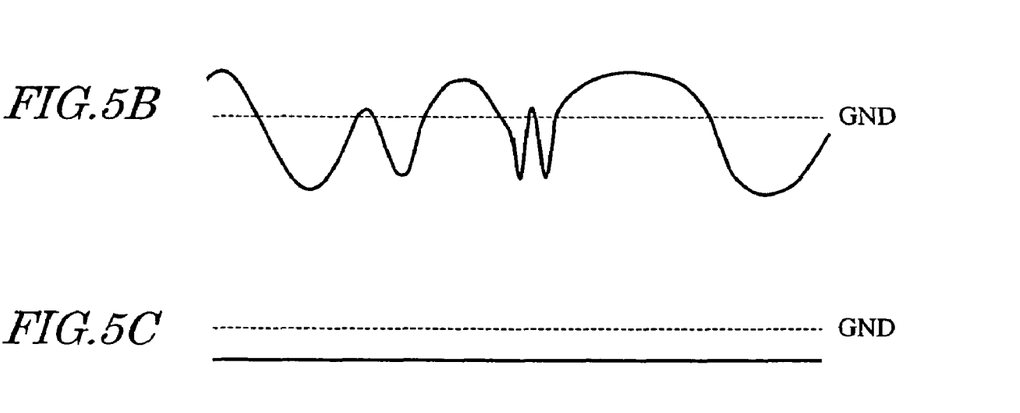

The divider 51 receives the frontlight signal having passed through the -high-pass filter 15a and the RF signal from the photodetector 13, and divides the frontlight signal having passed through high-pass filter 15a by the RF signal. FIG. 5A and FIG. 5B show the waveforms of an RF signal which is input to the divider 51 and an output signal from the divider 51. The waveform of the frontlight signal having passed through the high-pass filter 15a is shown in FIG. 3C. The frontlight signal having passed through the high-pass filter 15a contains a signal component which is in synchronization with the RF signal, and its amplitude is lopsided toward the minus side due to scoop. Therefore, the signal which is obtained through division has a waveform such that its amplitude is greatly enlarged toward the minus side.

The low-pass filter 52 allows only the DC component of the signal which is obtained through division to pass therethrough. In the case where the optical disk 1 is a DVD, the low-pass filter 52 allows a signal component of several hundreds of kHz or less to pass therethrough. FIG. 5C shows the waveform of the signal having passed through the low-pass filter 52. Thus, the signal has a DC component which is offset toward the minus side.

The comparator 53 compares this signal against a predetermined setting value, and if it exceeds the setting value, outputs a control signal to the light source driving section 31 so as to change the driving characteristics thereof. In the present embodiment, as shown in FIG. 2, a control signal is output to the current control section 14b so as to change its output power target value.

Figure 6A:
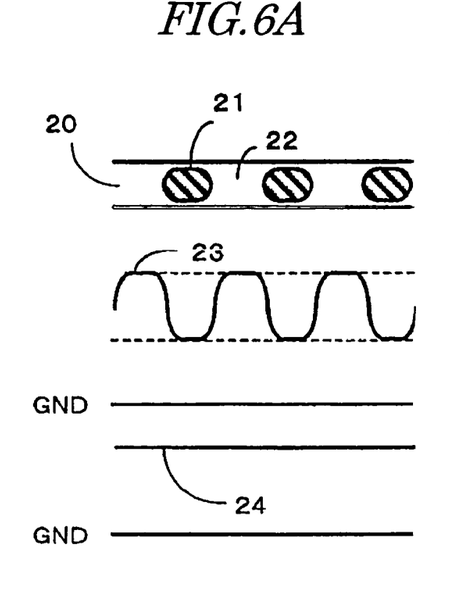
FIG. 6A and FIG. 6B are figures schematically showing correspondence between recording marks on an optical disk and an RF signal and a frontlight signal.
Figure 6B:
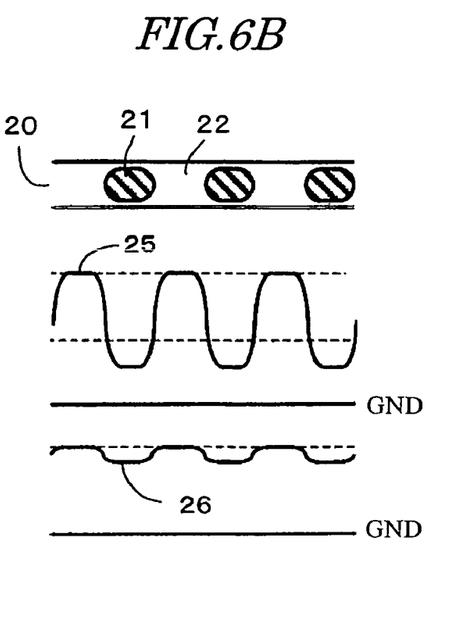

FIG. 6A and FIG. 6B show relationships between recording marks, the RF signal, and the frontlight signal, in the cases where the output power of the laser 11 is 0.5 mW and 1.0 mW. As shown in the figure, in the case where the output power of the laser 11 is 0.5 mW, the frontlight signal 24 is constant and the RF signal-has a proper waveform. On the other hand, in the case where the output power of the laser 11 is 1.0 mW, the light amount of the returned light increases, and a scoop occurs due to the output power of the laser 11 fluctuating in accordance with changes in the light amount of the returned light. Therefore, the frontlight signal 26 fluctuates. Moreover, the RF signal 25 has smaller intensities in the regions of the recording marks 21.

In such a case, if the comparator 53 detects amplitude fluctuations in the frontlight signal as shown in FIG. 5C, the current control section 14b lowers the output power target value so that the laser 11 is driven with a lower driving current. As a result, the light amount of the returned light is reduced, the occurrence of scoop is suppressed, and the fluctuations of the frontlight signal, i.e., the fluctuations of the output power of the laser 11, are suppressed.

Figure 7:
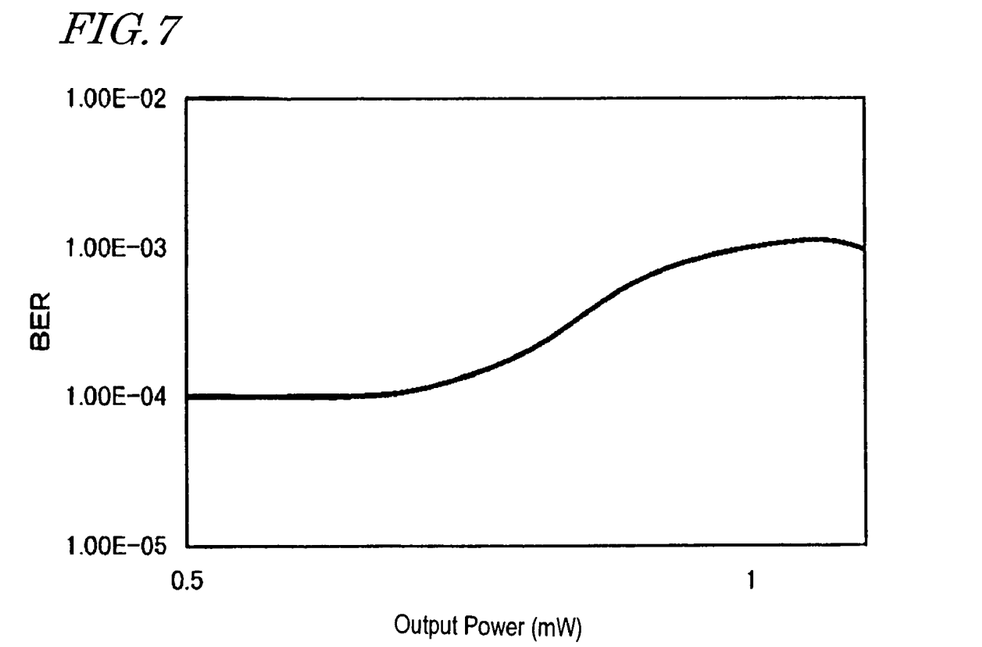
FIG. 7 is a graph showing an exemplary relationship between the output power and the bit error rate.

FIG. 7 shows an error rate (Byte Error Rate, hereinafter abbreviated as BER) of the data which is obtained from the reproduced signal, in the case where a scoop occurs with an increase in the output power of the laser 11 as has been described with respect to FIG. 5A and FIG. 5B. If a scoop occurs, the symmetry of the RF signal is lost, and therefore the data cannot be correctly reproduced and the error increases. As shown in the figure, BER is $1 \times 10^{-3}$ in the case where the output power of the laser 11 is 1.0 mW, but is lowered to $1 \times 10^{-4}$ when the output power is lowered to 0.5 mW.

Thus, according to the present embodiment, in the case where the output power of the laser fluctuates due to returned light, the influence of the scoop is evaluated by using a frontlight signal, and if the influence of the scoop is large, the driving characteristics of the light source driving section are changed, whereby the returned light can be reduced. Therefore, the output power of the laser can be stabilized. Moreover, the influence of the fluctuation in the laser output power can be removed from or reduced in the RF signal, and deterioration in the waveform symmetry, reproduction jitter, and error rate can be prevented.

By using the present invention for an optical disk apparatus which is capable of recording, it becomes possible to accurately perform learning of recording power and write compensation learning. Even in an apparatus which only performs reproduction, since the reproduction jitter and error rate are reduced, the RF signal can be detected more accurately.

Moreover, according to the present embodiment, the reproduction jitter and error rate can be reduced without changing the laser structure or taking jitter measurements.

Note that, in the present embodiment, a frontlight signal which has passed through the high-pass filter 15a is divided by the RF signal at the amplitude detection section 15b, and the amplitude fluctuation amount of the resultant signal is detected. This is in order to, in the amplitude fluctuation amount of the frontlight signal, only detect a component which is in synchronization with the RF signal, without detecting any noise in the circuitry, which will not be in proportion with the outgoing light and only appear in the frontlight signal. In the case where a constitution that makes it possible to eliminate noise in the circuitry is used, and an amplitude fluctuation amount containing a component which is in synchronization with the RF signal as well as a component which is not in synchronization with the RF signal is to be detected, the constitution of a second embodiment described below can be utilized.

Second Embodiment

Figure 8:
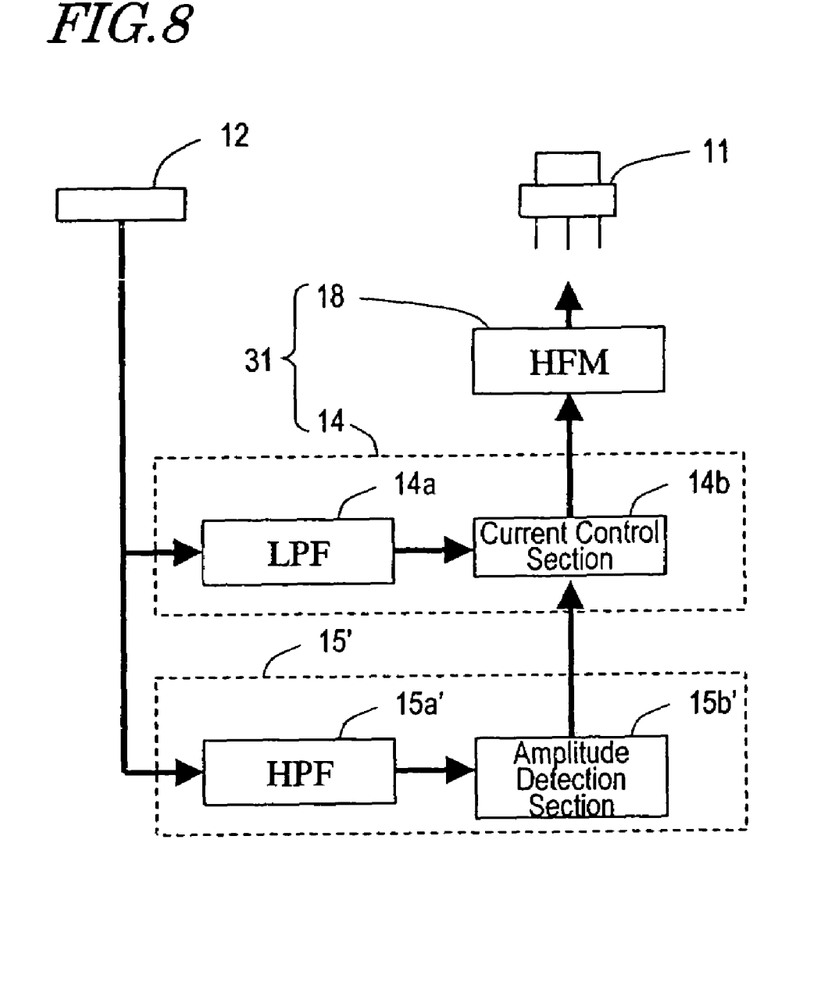
FIG. 8 is a block diagram showing the constitution of the light source driving section and the amplitude fluctuation detection section, which are a main portion of the second embodiment of the optical disk apparatus according to the present invention.

Hereinafter, a second embodiment of the present invention will be described with reference to the drawings. The present embodiment illustrates an optical disk apparatus which, in the case where there is a scoop that is not in synchronization with the RF signal, suppresses deterioration of the reproduction jitter, error rate, and the like, and provides a high-quality reproduced signal. An example of scoop which is not in synchronization with the RF signal may be, as described earlier, a scoop which occurs due to warpage of an optical disk. If a warped optical disk is subjected to reproduction, the distance between the laser and the recording layer of the optical disk fluctuates, and the phase difference between the returned light and the light emitted from the laser also changes. Therefore, the intensity of the returned light due to light interference changes, and the output power of the laser also fluctuates. FIG. 8 is a block diagram showing a main portion of the second embodiment of the optical disk apparatus according to the present invention. The optical disk apparatus of the present embodiment differs from the first embodiment in that an amplitude fluctuation detection section 15' is comprised instead of the amplitude fluctuation detection section 15. The light source driving section 31 and other constituent elements are identical to those of the first embodiment.

As in the first embodiment, the amplitude fluctuation detection section 15' detects an amplitude fluctuation amount of the frontlight signal, and if the amplitude fluctuation amount exceeds a predetermined value, changes the driving characteristics of the light source driving section 31. For this purpose, the amplitude fluctuation detection section 15 includes a high-pass filter 15a' and an amplitude detection section 15b', receives the frontlight signal and passes it through the high-pass filter 15a, and inputs the frontlight signal having passed through the high-pass filter 15a' to the amplitude detection section 15b'.

The amplitude fluctuation detection section 15' detects fluctuation in the high-frequency component of the frontlight signal which has not been controlled to a predetermined value by the LPC 14. For this purpose, the high-pass filter 15a' has characteristics such that it removes or suppresses a low-range component, i.e., a signal which has a lower frequency than the frequency of a scoop that occurs due to warpage of the optical disk. The frequency of the scoop occurring due to warpage of the optical disk is determined from the degree of warpage of the optical disk, the wavelength of the light emitted from the laser 11, the rotation speed of the optical disk, and the like. In the case where the optical disk 1 is a DVD, the high-pass filter 15a' has characteristics such that it allows any frequency higher than several hundreds of kHz to pass therethrough.

Figure 10A:
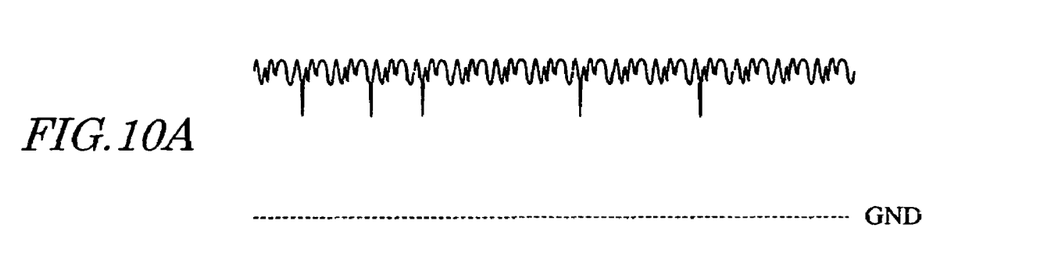
FIG. 10A and FIG. 10B show signal waveforms at various points in the amplitude fluctuation detection section according to the second embodiment.
Figure 10B:
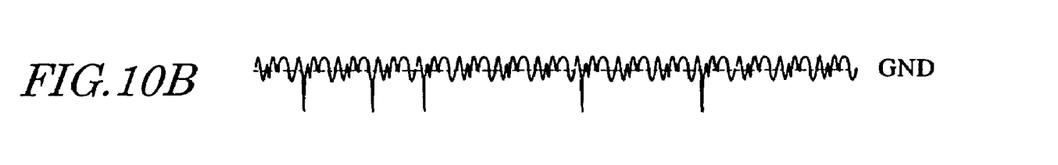

FIG. 10A schematically shows the waveform of a frontlight signal which is influenced by a scoop occurring due to warpage of the optical disk. From the frontlight signal shown in FIG. 10A, the high-pass filter 15a removes or suppresses the low-range component, thus generating a signal which only contains the high-frequency component of the frontlight signal, as shown in FIG. 10B. Since the DC component (which is a low-frequency component) is removed, a signal which fluctuates toward the plus side and the minus side with respect to a reference potential (GND) is obtained.

Figure 9:
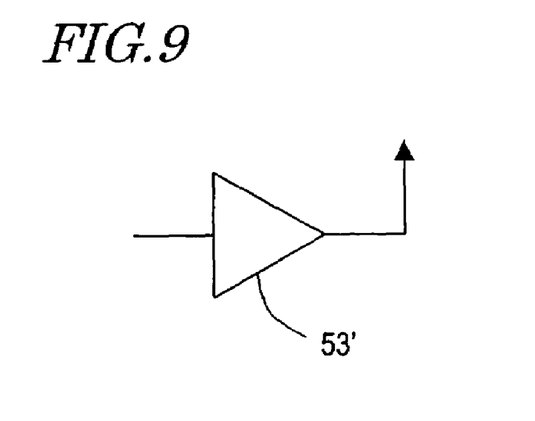
FIG. 9 is a block diagram showing a more detailed constitution of the amplitude fluctuation detection section according to the second embodiment.

For example, the amplitude detection section 15b' includes a comparator 53' as shown in FIG. 9, and compares the frontlight signal having passed through the high-pass filter 15a' against a predetermined setting value, and if it exceeds a setting value, outputs a control signal to the light source driving section 31 so as to change the driving characteristics thereof. In the present embodiment, as shown in FIG. 8, a control signal is output to the current control section 14b so as to change its output power target value. As in the first embodiment, in the case where the scoop occurring due to warpage of the optical disk increases with an increase in the output power of the laser 11, a control signal which reduces the output power target value is output to the current control section 14b. As a result, the returned light can be reduced, and the scoop occurring due to warpage of the optical disk can also be reduced.

Thus, according to the present embodiment, in the case where there is a scoop due to warpage of the optical disk, too, the influence of the scoop is evaluated by using a frontlight signal, and if the influence of the scoop is large, the driving characteristics of the light source driving section are changed, whereby reflected light from the laser and returned light can be changed and reduced. Therefore, the output power of the laser can be stabilized. Moreover, by stabilizing the output power of the laser, deterioration in the reproduction jitter and error rate can be prevented.

Although the first and second embodiments illustrate examples where the scoop increases with an increase in the output power of the laser 11, the relationship between scoop and laser output power is not limited thereto. If, owing to variations in the characteristics of the quarter-wave plate, polarization beam splitter, and like used in the optical system as well as positioning variations, the light emitted from the laser and the reflected light from the optical disk are of such a phase difference relationship that they weaken each other, then the returned light entering the laser will be reduced as the output power of the laser increases and the light amount of the reflected light increases. In such a case, the output power target value which is set in the current control section 14b may be controlled so as to increase.

Moreover, although the amplitude fluctuation detection section includes a high-pass filter in the first and second embodiments, the high-pass filter may be omitted because the LPC controls the laser output power so as not to fluctuate from a predetermined value at low frequencies, such that the low-frequency component of the frontlight signal is substantially constant. In this case, since the output power is changed under the control of the amplitude fluctuation detection section, and the value of the low-frequency component of the frontlight signal changes, it is preferable to change the reference against which the amplitude fluctuation amount of the frontlight signal is evaluated in the amplitude detection section.

Moreover, the aforementioned relationship between the occurrence of scoop and the output power of the laser 11 may differ depending on the characteristics of the optical system of the optical disk apparatus 200 and the type of optical disk. Therefore, if the amplitude fluctuation amount exceeds a predetermined value when the amplitude fluctuation amount of the frontlight signal is detected, the target value to be given to the current control section 14b may be determined through learning. Specifically, when the amplitude fluctuation amount exceeds a predetermined value, a target may be initially set so as to lower the output power of the laser 11, and then it is checked whether the amplitude fluctuation amount decreases or not. If the amplitude fluctuation amount increases on the contrary, a target value which is greater than the target value which was first set for the output power of the laser 11 is set anew, and the amplitude fluctuation amount is checked again. Such learning is repeated to find a target value to be given to the current control section 14b so as to reduce the amplitude fluctuation amount. In view of the possibility that the RF signal may deteriorate due to an increased scoop and that data may not be correctly obtained, it would be preferable to first make an adjustment by lowering the output power, and if no improvement is observed in the amplitude fluctuation of the frontlight signal, then make an adjustment by increasing the output power.

The amount of adjustment to be made in the output power when scoop is detected is preferably set as follows. In the case where the optical disk 1 is a recordable optical disk, the upper limit value is preferably set in a range such that the recording marks formed on the optical disk are not deteriorated by the reproduction light. For example, it is set to about 150% of the standard output power. The lower limit value is preferably set in a range such that the signal noise removing ratio (Signal Noise Ratio, hereinafter abbreviated as SNR) are not deteriorated in the pickup for receiving the signal and in the circuits for processing the signal from the pickup, and that focusing servo and tracking servo are not defeated. For example, it is set to about 50% of the standard output power.

Figure 11A:
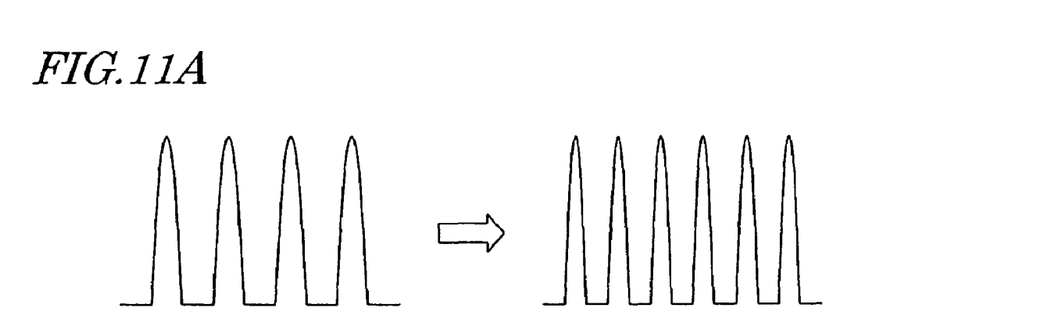
FIG. 11A and FIG. 11B are diagrams schematically showing an example in which the oscillation frequency and oscillation power of a high-frequency module are changed.
Figure 11B:
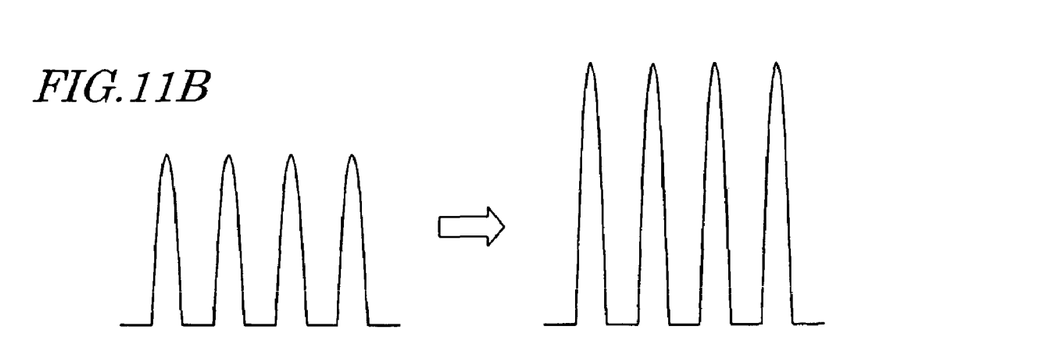

In the first and second embodiments described above, a driving current is chosen as the driving characteristics of the light source driving section, and the target value of the driving current in the current control section is changed. Alternatively, the oscillation frequency or oscillation power of the HFM 18 may be chosen as the driving characteristics, and caused to change. FIG. 11A and FIG. 11B show waveforms, respectively, in the case where the transmission frequency is changed while keeping a constant output power, and in the case where the oscillation power is changed while keeping a constant transmission frequency. Depending on the type or standard of the optical disk, the thickness of the substrate which is provided on the surface of the recording layer may differ, and due to warpage (tilt) of the optical disk, the optical path length from the emission point of the laser to the recording layer of the optical disk may change. Therefore, by adjusting the frequency and oscillation power of the HFM, the phase difference between the returned light and the light emitted from the laser changes, so that a setting where the laser power fluctuation is reduced can be obtained.

Note that, in the case where there is a tradeoff between the oscillation frequency or oscillation power setting in the HFM 18 that most lowers the scoop and the HFM setting that most reduces noise in the RF signal, e.g., in the case where increasing the HFM oscillation power will result in a reduced scoop but an increased noise in the laser and other devices such that the SNR of the RF signal are deteriorated, it will be necessary to take both into accounts when setting the oscillation frequency or oscillation power.

Moreover, the oscillation frequency or oscillation power of the HFM may be changed depending on the optical disk which is to be subjected to reproduction. Since the amounts of reflectance and birefringence differ depending on the type of optical disk and the characteristics of each, the amount of returned light to the laser will change. Due to this influence, the conditions under which scoop occur will change. In such a case, by changing the oscillation frequency or oscillation power of the HFM, the conditions under which scoop occur can be subdued, and conditions which will provide a good RF signal SNR can be set.

INDUSTRIAL APPLICABILITY

According to the present invention, deterioration in the reproduction jitter, error rate, and the like due to scoop can be suppressed, and a high-quality reproduced signal can be obtained. Therefore, the present invention can be suitably applied to an optical disk apparatus which performs recording or reproduction. In particular, the present invention is suitably used for an optical disk apparatus which supports a plurality of types or a plurality of standards.

The invention claimed is:
1. An optical disk apparatus comprising:
a light source;
an objective lens for converging light emitted from the light source toward an optical disk;
a first photodetection device for detecting reflected light from the optical disk and outputting a first signal;
a signal processing section for receiving the first signal and generating a signal containing information recorded on the optical disk;
a second photodetection device for detecting frontlight which is a portion of the light emitted from the light source and outputting a second signal;

a light source driving section for receiving the second signal, and based on the second signal, driving the light source so as to emit the light at an output power of the light source which equals a target value; and an amplitude fluctuation detection section for detecting an amplitude fluctuation amount of the second signal, and if the amplitude fluctuation amount exceeds a predetermined value, changing driving characteristics of the light source driving section.

2. The optical disk apparatus of claim 1, wherein the light source driving section includes a current control section for receiving the second signal and generating a driving current which is controlled so that the output power of the light source equals the target value, and a high-frequency module for modulating the driving current with a predetermined frequency and oscillation power.

3. The optical disk apparatus of claim 2, wherein the amplitude fluctuation detection section detects the amplitude fluctuation amount of the second signal, and if the amplitude fluctuation amount exceeds the predetermined value, changes a modulation frequency of the high-frequency module.

4. The optical disk apparatus of claim 2, wherein the amplitude fluctuation detection section detects the amplitude fluctuation amount of the second signal, and if the amplitude fluctuation amount exceeds the predetermined value, changes an oscillation power of the high-frequency module.

5. The optical disk apparatus of claim 2, wherein the current control section generates the driving current based on a predetermined frequency component of the second signal, and the predetermined frequency component is approximately $1/10$ or less of a frequency of the first signal.

6. The optical disk apparatus of claim 2, wherein the amplitude fluctuation detection section detects the amplitude fluctuation amount of the second signal, and if the amplitude fluctuation amount exceeds the predetermined value, changes the target value in the current control section.

7. The optical disk apparatus of claim 6, wherein the amplitude fluctuation detection section receives the first signal, and based on the first signal, detects an amplitude fluctuation amount of a component of the second signal that is in synchronization with the first signal.

8. The optical disk apparatus of claim 1, wherein the amplitude fluctuation detection section includes a high-pass filter, and detects the amplitude fluctuation amount of the second signal having passed through the high-pass filter.

9. The optical disk apparatus of claim 1, wherein the amplitude fluctuation detection section changes an oscillation power in accordance with the type of the optical disk.

10. The optical disk apparatus of claim 1, further comprising a servo control section which generates a focusing signal and a tracking signal based on the first signal, in order to move the objective lens along a focusing direction and a tracking direction to radiate a light beam onto a track of the optical disk.

11. The optical disk apparatus of claim 1, wherein the light source is a laser, and the light source driving section controls the output power of the laser by modulating a current which drives the laser based on the second signal so as to equal the target value.

12. An information recording/reproduction method by an optical disk apparatus including: a light source; an objective lens for converging light emitted from the light source toward an optical disk; a first photodetection device for detecting reflected light from the optical disk and outputting a first signal; and a signal processing section for receiving the first signal and generating a signal containing information recorded on the optical disk, the information recording/reproduction method comprising:

a step of detecting frontlight which is a portion of the light emitted from the light source and outputting a second signal;

a step of receiving the second signal, and based on the second signal, driving the light source so as to emit the light at an output power of the light source which equals a target value; and a step of detecting an amplitude fluctuation amount of the second signal, and if the amplitude fluctuation amount exceeds a predetermined value, changing driving characteristics in the step of driving the light source.

13. The information recording/reproduction method of claim 12, wherein the step of driving the light source includes a step of receiving the second signal and generating a driving current which is controlled so that the output power of the light source equals the target value, and a step of modulating the driving current with a predetermined frequency and oscillation power.

14. The information recording/reproduction method of claim 13, wherein the step of changing the driving characteristics detects the amplitude fluctuation amount of the second signal, and if the amplitude fluctuation amount exceeds the predetermined value, changes a modulation frequency in the modulation step.

15. The information recording/reproduction method of claim 13, wherein the amplitude fluctuation detection section detects the amplitude fluctuation amount of the second signal, and if the amplitude fluctuation amount exceeds the predetermined value, changes an oscillation power of the high-frequency module.

16. The information recording/reproduction method of claim 13, wherein the step of driving the light source executes a step of generating the driving current based on a frequency component of the second signal, the predetermined frequency component being approximately $1/10$ or less of a frequency of the first signal.

17. The information recording/reproduction method of claim 13, wherein the step of changing the driving characteristics detects the amplitude fluctuation amount of the second signal, and if the amplitude fluctuation amount exceeds the predetermined value, changes the target value in the step of generating the driving current.

18. The information recording/reproduction method of claim 17, wherein the step of changing the driving characteristics receives the first signal, and based on the first signal, detects an amplitude fluctuation amount of a component of the second signal that is in synchronization with the first signal.

19. The information recording/reproduction method of claim 12, wherein the step of changing the driving characteristics further includes a step of removing a low-range component from the second signal, and detects the amplitude fluctuation amount of the signal from which the low-range component has been removed.

20. The information recording/reproduction method of claim 12, wherein the step of changing the driving characteristics changes an oscillation power in accordance with the type of the optical disk.

* * * * *